US011371878B2

(12) United States Patent
Leizerson et al.

(10) Patent No.: US 11,371,878 B2
(45) Date of Patent: Jun. 28, 2022

(54) OPTICAL DETECTION OF VIBRATIONS

(71) Applicant: Elbit Systems Land and C4I Ltd., Netanya (IL)

(72) Inventors: Ilya Leizerson, Netanya (IL); Dan Nussinson, Netanya (IL)

(73) Assignee: Elbit Systems Land and C4I Ltd., Netanya (IL)

(*) Notice: Subject to any disclaimer, the term of this patent is extended or adjusted under 35 U.S.C. 154(b) by 661 days.

(21) Appl. No.: 16/326,951

(22) PCT Filed: Aug. 28, 2017

(86) PCT No.: PCT/IL2017/050957
§ 371 (c)(1),
(2) Date: Feb. 21, 2019

(87) PCT Pub. No.: WO2018/042424
PCT Pub. Date: Mar. 8, 2018

(65) Prior Publication Data
US 2019/0212187 A1 Jul. 11, 2019

(30) Foreign Application Priority Data
Aug. 29, 2016 (IL) .......................................... 249474

(51) Int. Cl.
G01B 11/16 (2006.01)
G01H 9/00 (2006.01)
G01B 9/02 (2022.01)

(52) U.S. Cl.
CPC ......... G01H 9/002 (2013.01); G01B 9/02084 (2013.01); G01B 9/02094 (2013.01);
(Continued)

(58) Field of Classification Search
CPC .... G01H 9/002; G01B 11/161; G01B 11/164; G01B 11/162; G01B 9/02094; G01B 9/02084
See application file for complete search history.

(56) References Cited

U.S. PATENT DOCUMENTS

| 4,979,818 A | 12/1990 | Kobayashi |
| 2005/0160822 A1 | 7/2005 | Langdon |

(Continued)

FOREIGN PATENT DOCUMENTS

| CN | 104776907 | 7/2015 |
| CN | 104819769 | 8/2015 |

(Continued)

OTHER PUBLICATIONS

International Search Report of PCT Application No. PCT/IL2017/050957, dated Jan. 10, 2018.
(Continued)

*Primary Examiner* — Jonathan M Hansen
(74) *Attorney, Agent, or Firm* — Pearl Cohen Zedek Latzer Baratz LLP

(57) ABSTRACT

Systems and methods are provided for vibrations detection in a scene. Systems comprise at least one coherent light source configured to illuminate the scene, an optical unit configured to focus scattered light from the scene onto a pixelated detector, the detector configured to provide pixel intensity signals, and a processing unit configured to analyze the pixel intensity signals over the pixels of the detector to derive a vibration spectrum of elements in the scene that correspond to the pixels. The signal modulation at each pixel may be used to indicate the vibrations of the scene element(s) that corresponds to the pixel(s). Vibration information concerning the scene may be used to direct other methods of vibration measurements, such as speckle inter- (Continued)

ferometry, according to derived vibration images of the scene.

18 Claims, 8 Drawing Sheets

(52) U.S. Cl.
CPC .......... *G01B 11/161* (2013.01); *G01B 11/162* (2013.01); *G01B 11/164* (2013.01)

(56) References Cited

U.S. PATENT DOCUMENTS

| | | |
|---|---|---|
| 2006/0209631 A1 | 9/2006 | Melese et al. |
| 2008/0043233 A1 | 2/2008 | Snabre et al. |
| 2009/0251706 A1 | 10/2009 | Rembe et al. |
| 2012/0301967 A1 | 11/2012 | Nadkarni |
| 2015/0157224 A1* | 6/2015 | Carmon ................ A61B 5/165 |
| | | 600/479 |
| 2017/0215015 A1* | 7/2017 | Iwasaki ................ H04R 23/008 |
| 2018/0266876 A1* | 9/2018 | Carmon ............. G01N 21/4788 |

FOREIGN PATENT DOCUMENTS

| | | |
|---|---|---|
| EP | 0907875 | 4/2018 |
| WO | WO 98/38476 | 9/1998 |
| WO | WO 2012/101644 | 8/2012 |
| WO | WO 2016/103271 | 6/2016 |

OTHER PUBLICATIONS

Zalevsky et al. 2009, Simultaneous remote extraction of multiple speech sources and heart beats from secondary speckles pattern, Optics express 17(24): 21566-21580.

Babaie, G. et al. "Dynamic range enhancement imaging in laser interferometry"; Measurement Science and Technology 26, No. 1 (2014); Dec. 1, 2014.

Supplementary European Search Report for European Patent Application No. 17845666.1, dated Mar. 30, 2020.

* cited by examiner

OPTICAL DETECTION OF VIBRATIONS

CROSS-REFERENCE TO RELATED APPLICATIONS

This application is a National Phase Application of PCT International Application No. PCT/IL2017/050957, International Filing Date Aug. 28, 2017, entitled "OPTICAL DETECTION OF VIBRATIONS", published on Mar. 8, 2018, under publication No. WO 2018/042424, which claims priority of Israel Patent Application Nos. 249474 and 247541, both filed on Aug. 29, 2016, all of which are hereby incorporated by reference in their entireties.

BACKGROUND OF THE INVENTION

1. Technical Field

The present invention relates to the field of vibration sensing, and more particularly, to imaging of vibrations.

2. Discussion of Related Art

Remote sensing of small vibrational motion using speckle interferometry is a well-known and demonstrated method (see e.g., Zalevsky et al. 2009, Simultaneous remote extraction of multiple speech sources and heart beats from secondary speckles pattern, Optics express 17(24): 21566-21580). In this method a camera is used to capture the speckle pattern formed by the scattering of coherent light (usually a laser) from a diffusive target. In order to achieve high gain the camera is focused on a plane (focus plane) which is far from the target position. Small tilt variations of the target are expressed by a translational motion of the speckle pattern at the imaging plane. The translation distance is proportional to the target's tilt angle change between consecutive frames and the distance between the target and the focus plane.

Laser speckle interferometry may be employed for detecting vibrations, by directing the laser beam toward the interrogated object surface or a point in the scene. The incident laser beam diffusively reflects therefrom. The scattering of different portions of the light beam from the rough surface results in a random shift of the phases of the portions of the corresponding light waves and a random distribution of the intensities thereof. Consequently, the beam portions scattered from different surface portions interfere with each other, resulting in a light distribution with varying intensity in space. The random variations in the intensity constitute a speckle pattern for each light beam. An imager acquires images of the reflection of the laser beam from the surface, which include speckle patterns. The shift of the speckle patterns between subsequent images can be related to the vibrations of the small surface part and thus to reconstruction of motion and vibrations.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a system comprising at least one coherent light source configured to illuminate a scene, an optical unit configured to focus scattered light from the scene onto a pixelated detector, the detector configured to provide pixel intensity signals, and a processing unit configured to analyze the pixel intensity signals over the pixels of the detector to derive a vibration spectrum of elements in the scene that correspond to the pixels.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1A:
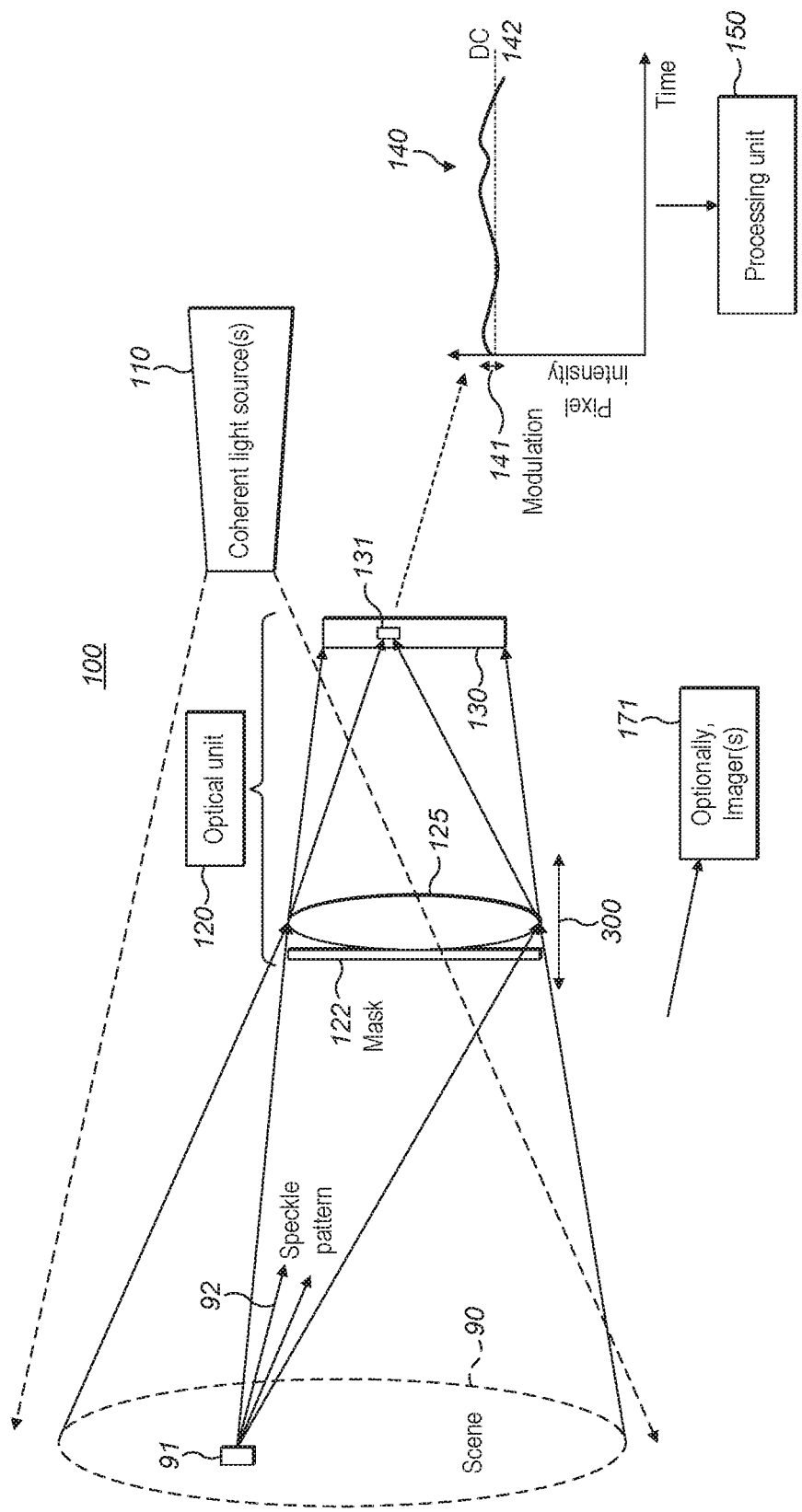
FIGS. 1A and 1B are high level schematic illustrations of a system, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units may be at least partially implemented by a computer processor.

Embodiments of the present invention advantageously produce a map of vibration amplitudes, temporal frequencies and other temporal characteristics on the entire field of view (FOV) of the camera, to provide simultaneous information on the entire FOV and eliminate the need to scan the target.

Systems and methods are provided for sensing of vibrations in an entire scene, to yield quantitative measurements of motions and vibrations in the scene and to their reconstruction. Systems comprise at least one coherent light source configured to illuminate the scene, an optical unit configured to focus scattered light from the scene onto a pixelated detector, the detector configured to provide pixel intensity signals, and a processing unit configured to analyze the pixel intensity signals over the pixels of the detector to derive a vibration spectrum of elements in the scene that correspond to the pixels. The signal modulation at each pixel may be used to indicate the vibrations of the scene element(s) that corresponds to the pixel(s). Vibration information concerning the scene may be used to direct other methods of vibration measurements, such as speckle interferometry, according to derived vibration images of the scene.

Figure 1B:
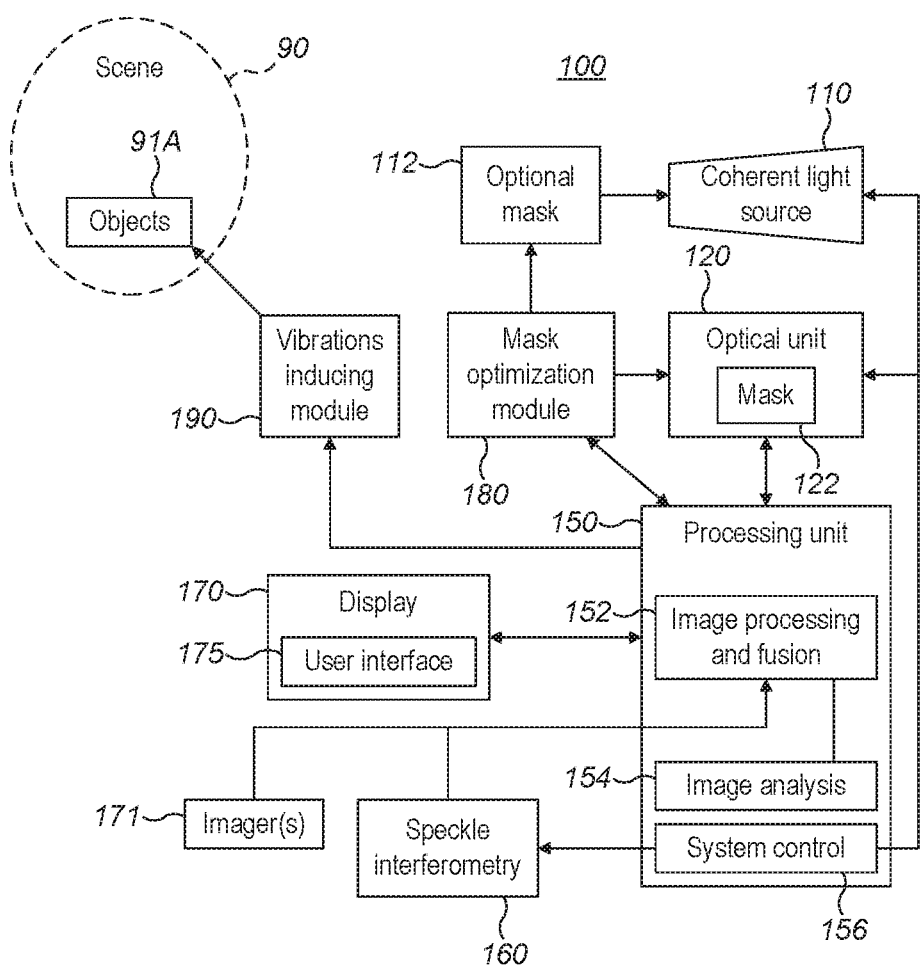

FIGS. 1A and 1B are high level schematic illustrations of a system 100, according to some embodiments of the invention. FIG. 1B extends schematically FIG. 1A, and system 100 may comprise any operable combination of elements from FIGS. 1A and 1B. System 100 comprises at least one coherent light source 110 (e.g., one or more lasers) configured to illuminate a scene 90, an optical unit 120, having optical element(s) 125, configured to focus scattered light from scene 90 onto a pixelated detector 130, which is configured to provide pixel intensity signals, and a processing unit 150 configured to analyze the pixel intensity signals 140 over pixels 131 of detector 130 to derive a vibration spectrum of elements 91 in scene 90 that correspond to pixels 131 (by the focusing and according to system parameters). Analysis of pixel intensity signals 140 may be carried out by various methods, e.g., applying Fourier transforms (e.g., FFT—fast Fourier transform), wavelet analyzes, deriving spectrograms, etc.

Coherent light source 110 may be configured to illuminate the whole scene 90, and may be a wide angle illuminator and/or may use an optical system (not shown) to direct the coherent illumination at selected scene 90, possibly at different distances from coherent light source 110. For example, coherent light source 110 may comprise a laser. It is noted that multiple coherent light sources 110 may be used to illuminate scene 90, possibly at different wavelengths, and optical unit 120 may be configured accordingly to operate at different wavelengths.

Elements 91, which may represent a part of a rough surface, typically scatter the coherent illumination to form the speckle patterns 92. Area 91 may be considered as being observed by a particular corresponding camera pixel 131 (IFOV). Elements 91 may comprise objects, object surfaces and generally any part of the scene which is focused onto pixel 131 of detector 130, i.e., the sizes of elements 91 may vary according to parameters of optical unit 120, distance of scene 90 therefrom etc. Scattered speckle pattern 92 moves upon vibrations of or in element 91 and therefore speckle pattern 92 from each vibrating element 91 varies over time.

In optical unit 120, one or more optical element 125 is configured to focus scattered light from scene 90 onto detector 130, i.e., focus scattered light (with speckle patterns 92, see e.g., an illustration of a speckle pattern in FIG. 2A below) from multiple elements 91 onto respective multiple pixels 131. Optical elements 125 and their dimensions and stops define the aperture stop dimension and its position. In case of a single lens, for example, the aperture stop position is the same as the lens aperture. Optical element(s) 125 may be positioned at the pupil (Fourier) plane of optical unit 120 and focus the scene image onto detector 130 at the field plane of optical unit 120. Optical unit 120 therefore integrates speckle pattern 92 from each scene element 91 onto pixel 131 to provide one intensity value at any time, which may change over time to yield pixel intensity signal 140. Changes in the intensity value in each pixel 131 result mainly from the movements of speckle patterns 92 due to element vibration. The intensity value fluctuations (in any of pixels 131) correspond to speckle pattern elements entering and exiting the borders of the aperture stop due to the speckle pattern movements—only regions close to the aperture stop border contribute to the signal variation with time, as the part of the speckle pattern which is internal in the aperture stop area does not contribute to the total intensity variation with time.

Pixel intensity signal 140 in each pixel 131 typically comprises a DC component 142 (average signal intensity) and a modulation components 141 reflecting the changes due to the movements of speckle pattern 92. The inventors have found out that analyzing pixel intensity signals 140 over pixels 131 may provide information about the vibrations of elements 91 in scene 90.

Processing unit 150 may be configured to analyze pixel intensity signals 140 over pixels 131 of detector 130 and may be further configured to identify locations (e.g., one or more scene element 91) in scene 90 that correspond to pixels 131 having specified characteristics of respective pixel intensity signals 140 or other temporal characteristics. For example, the analysis may be used to indicate vibrating objects in scene 90 such as cars, machines, people etc.

In operation, a camera (as an example of optical unit 120) may be focused on the target plain (scene 90), and the illumination spot of illuminator 110 may be broadened to the entire FOV of the camera or part of it to produce a focused image of the target plane. The image quality is slightly impaired by the speckled effect of the coherent illumination. The intensity of each pixel is related to the total intensity of the speckle pattern on the aperture stop of optical unit 120, formed by scattering of the coherent light from the pixel's instantaneous field of view (IFOV). Tilt vibrations or other motions of element 91 may result in translations of the speckle pattern 92 on the aperture stop, thus introducing small variations in the pixel's intensity on detector 130. By recording a video of scene 90 and performing frequency analysis of pixel intensity signals 140 of each pixel 131, regions in scene 90 may be differentiated according to pixel intensity signals characteristics, such as vibration spectra, vibration amplitude thresholds etc. Since the pixel intensity variation is produced only by speckles on the aperture stop perimeter, the sensitivity of system 100 may be enhanced by introducing mask(s) on the aperture stop.

Optical unit 120 may further comprise a spatially patterned mask 122 configured to enhance fluctuations of the pixel intensity signals and/or to increase a ratio between modulation 141 and DC 142. As the pixel intensity signal fluctuations are due to speckle pattern elements entering and exiting the edges of pixel 131, using mask 122 that increases the amount of edges on the aperture stop can, at certain configurations, increase the modulation 141 with respect to DC signal 142. Processing unit 150 may be further configured to optimize the spatial pattern of mask 122 according to specified criteria, for example, geometrical features of mask 122 and/or features size and density may be modified according to estimates speckle dimensions. Mask 122 may be optimized at a setup stage and/or in real-time, by processing unit 150 and/or by an external processor. Examples for the effects of various masks 122 are presented below (see FIG. 4). System 100 may further comprise a mask optimization module 180 (FIG. 1B), e.g., associated with processing unit 150. Mask optimization module 180 is configured to optimize the mask configuration with respect to estimated speckle size, resulting modulation and DC. Mask optimization may relate to the general type of mask, to the horizontal and vertical cell sizes of the mask and/or to mask pitch. Mask optimization module 180 may be configured to alter mask 122 and compare results from processing unit 150 to perform the mask optimization.

Processing unit 150 may be further configured to analyze pixel intensity signals 140, e.g., by performing a Fourier transform thereof to the frequency domain, and analyzing temporal and frequency characteristics of the pixel intensity signals. Processing unit 150 may be configured to derive vibration spectra of elements 91 according to the analyzed temporal and frequency characteristics, typically a vibration spectrum for each element which corresponds to one or more pixels.

Processing unit 150 may be further configured to identify at least one interesting event in scene 90 according to the analyzed temporal and frequency characteristics. In certain embodiments, system 100 may be further configured to perform speckle interferometry 160 (FIG. 1B, shown schematically) with respect to specified locations in scene 90, e.g., particular locations which were identified as suspicious according to analyzed pixel intensity signals 140. System 100 may comprise a zoom module configure to magnify any identified element 91 to have parts of it imaged by multiple pixels 131.

Optical unit 120 may be further configured, upon a specified condition, to perform imaging in a de-focus regime of the scattered light, by moving optical element 125. Processing unit 150 may be further configured to perform speckle interferometry 160, to analyze shift(s) between consecutive images in a sequence of captured images and to relate the shift(s) between the images to motion of elements 91. De-focusing may be carried out by moving optical element(s) 125 to a position in which detector 130 is optically coupled to a plane which is out of the object plane, as described e.g., in Zalevsky et al. 2009 (cited above).

In the de-focus regime, the speckle pattern, which is created on the detector plane, is related to the rough object surface and its shape, to the optical parameters of the system, to the distances etc. The target surface acts as a diffusive reflector and the speckle pattern arises from the interference of the diffused scattered waves. The mean size of bright regions (known as speckles) is controlled by the beam diameter on the target (denoted D), on the optical wavelength (denoted $\lambda$), on distance between the object and the plane of imaging (denoted Z) and on the optical magnification (denoted M) of the optical system 120, according to Equation 1:

$$2\rho_{speckle} = 2M\frac{\lambda \cdot Z}{D} \qquad \text{Equation 1}$$

This pattern propagates over free space to receiving optical system 120, where it is detected on detector 130. The speckle pattern is sensitive both to the in-plane surface displacements as well as to the out-of-plane surface tilts. The object vibration waves cause the speckle pattern to be displaced slightly without destroying the overall speckle pattern. Using cross-correlation tools between sequential frames the tilt velocity or the displacement of the object surface may be measured and the tiny vibrations on the target may be correspondingly reconstructed.

As illustrated schematically in FIGS. 1A and 1B, system 100 may comprise one or more additional imager(s) 171, e.g., in various electromagnetic spectrum ranges such as IR (infrared), visible, millimeter range etc. Received images from imager(s) 171 may be fused with the temporal vibration information derived by the disclosed technique. For example, an image processing and fusion module in processing unit 150 may be configured to fuse images derived from analyzed pixel intensity signals 140 with images from imager(s) 171.

System 100 may further comprise a display 170 configured to display the derived information, in any of a number of modes such as (i) an indication of the temporal characteristics at each pixel, (ii) the intensity of modulation 141 at each pixels, (iii) the dominant frequency at each pixel, (iv) a representation of the frequency spectrum at each pixel, any modification thereof and/or integration with corresponding visual or infrared images. System 100 may further comprise a user interface 175 configured to provide the user with enhanced information such as more detailed information concerning the frequency spectra relating to certain pixels, pixel groups, element(s) 91 and/or objects in scene 90, such as detailed frequency spectra, analysis of intensities at different spectra and/or speckle interferometry results. User interface 175 may be configured to receive user input concerning interesting regions of objects to which more detailed measurements and analysis may be directed. User interface 175 may be a graphical user interface (GUI) enabling the user to manipulate images and image parts, and provide additional information concerning the images.

Processing unit 150 may comprise image processing capabilities, e.g., in an image analysis module 154, for detecting objects and characterizing them according to the derived temporal characteristics and/or frequency spectra. System 100 may further comprise a vibrations inducing module 190 configured to induce vibrations in one or more object(s) 91A in scene 90 (e.g., mechanically), and processing unit 150 may be further configured to detect the object(s)'s reactions to the induced vibrations by vibrations inducing module 190. Active vibrations inducing module 190 may be configured to apply vibrations in at least one object or object part in the scene and processing unit 150 may be configured to correlate derived vibration characteristics (e.g., spectrum) from analyzed pixel intensity signals 140 with characteristics of the induced vibrations.

Various parameters of system 100 may be modified or adapted to increase a ratio between modulation 141 of the pixel intensity signals and DC 142 thereof. For example, spatially patterned mask 122 may be modified accordingly, at a setup stage and/or in real-time. Processing unit 150 may further comprise a system control module 156 configured to modify, optimize and/or adapt system parameters such as light source parameters and optical unit parameters to optimize the detection and imaging capabilities of system 100. For example, system control module 156 may optimize the modulation to DC ratio, optimize masks, optimize a scanning pattern for speckle interferometry 160, optimize the activation of vibrations inducing module etc.

Image processing and fusion module 152 may be configured to provide a vibrations image of the scene (see example in FIG. 3), based on the derived temporal spectra and, possibly simultaneously, speckle interferometry data concerning specific points in the scene; and system control 156 may be configured to scanning a plurality of points in the scene and applying speckle interferometry thereto, according to vibrations characteristics derived concurrently from the vibrations' image. Image processing and fusion module 152 may be configured to use the speckle interferometry data to improve the vibrations' image and/or possibly fusing the vibrations image based on the derived temporal spectra with a visual range or infrared image 171 of the scene.

Processing unit 150 may be configured to compare or correlate the vibration data from different parts of at least one object in the scene to characterize a vibration pattern of the at least one object and optionally identify the at least one object according to the characterized vibration patterns across a surface of the at least one object. The vibration patterns may be passively measured as described above (using temporal and possibly frequency characteristics) and/or augmented by speckle interferometry data and/or active stimulation.

Figures 2A, 2B:
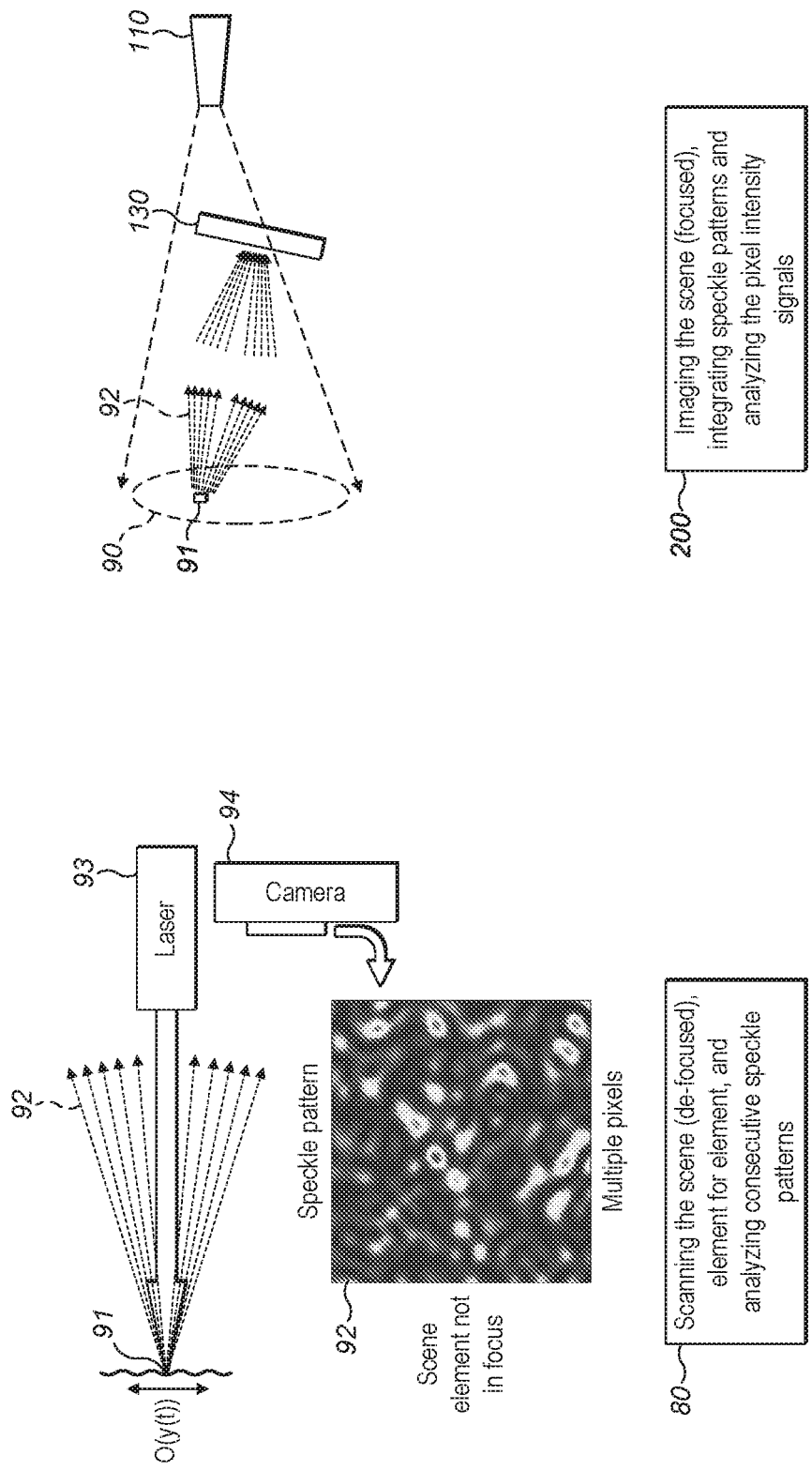
FIGS. 2A and 2B are high level schematic illustrations of the difference in operation principle between prior art speckle interferometry and some embodiments of the present invention, respectively.

FIGS. 2A and 2B are high level schematic illustrations of the difference in operation principle between prior art speckle interferometry and some embodiments of the present invention, respectively. Prior art speckle interferometry (FIG. 2A) point-illuminated scene element 91 by a laser 93, collects scattered speckle pattern 92 on de-focused camera detector 94 and analyses a displacement between consecutive speckle patterns 92. While prior art speckle interferometry may provide data concerning the vibrations and motions of objects (marked as O(y(t)), it requires scanning the scene and analyzes the de-focused speckle patterns (80). In contrast, system 100 employs area illumination of scene 90, illuminating multiple scene elements 91 simultaneously and integrates speckle patterns 92 from corresponding scene elements 91 simultaneously, at different pixels 131 by focusing the scene image on detector 130 (method 200, see FIG. 6 below).

Figure 3:
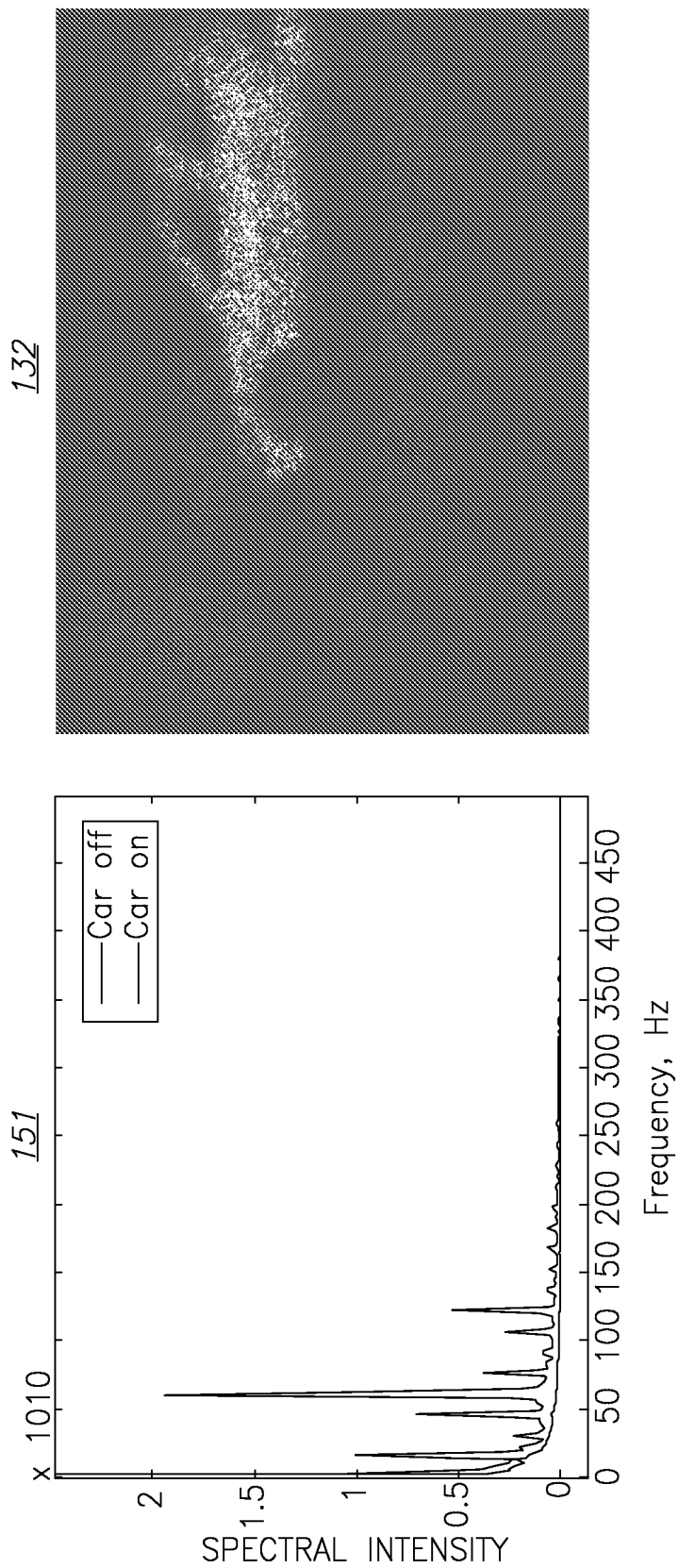
FIG. 3 is an exemplary illustration of the efficiency of the system and method, according to some embodiments of the invention.

FIG. 3 is an exemplary illustration of the efficiency of system 100 and method 200, according to some embodiments of the invention. Graph 151 illustrates the frequency domain spectrum of the pixels of a car in scene 90, with its engine off and on. Graph 151 indicates the clear and distinct vibration frequencies arising from turning the car engine on. Image 132 depicts the spatial distribution of the mean power spectral density of the detected vibrations in a specified frequency range 30-100 Hz. Image 132 provides detailed information about the car and its vibrating parts. It is noted that the contours of the vehicle are clear although the image is grained.

The inventors note that the grained structure of image 132 results from the statistic distribution of the intensity in the speckle pattern. The speckle pattern created on the entrance pupil of optical system 120 is different for different scattering elements 91 in an object (such as a car, containing many scene elements 131). Therefore, the entering and exiting of the speckle patterns corresponding to different elements 91 creates different signals on the corresponding camera pixel 131. The inventors note that although grained, image 132 may still be used to identify objects that vibrate in an environment. Moreover, the effect of the graining may be diminished by illumination of the object from a number of directions by lasers 110, which are not coherent with each other. In some embodiments, reduction of the graining may be carried out by sequential illumination of the object from various positions of laser 110. In contrast to the regular filtering of the image, the described approach does not decrease the image resolution.

Therefore, in the de-focus regime, at least one coherent illumination source 110 may comprise a plurality of coherent illumination sources 110 which are not coherent with each other and have different directions of illumination with respect to elements 91 in the scene and/or at least one coherent illumination source 110 may be configured to sequentially illuminate elements 91 in the scene from different directions.

Vibrations image 132 may be used to allocate and use other vibration measurement methods, such as speckle interferometry to regions of the car, or generally of scene 90, which are of special interest, e.g., scene elements 91 vibrating at specified frequencies and/or intensities, or exhibiting any other vibration characteristics.

Figure 4:
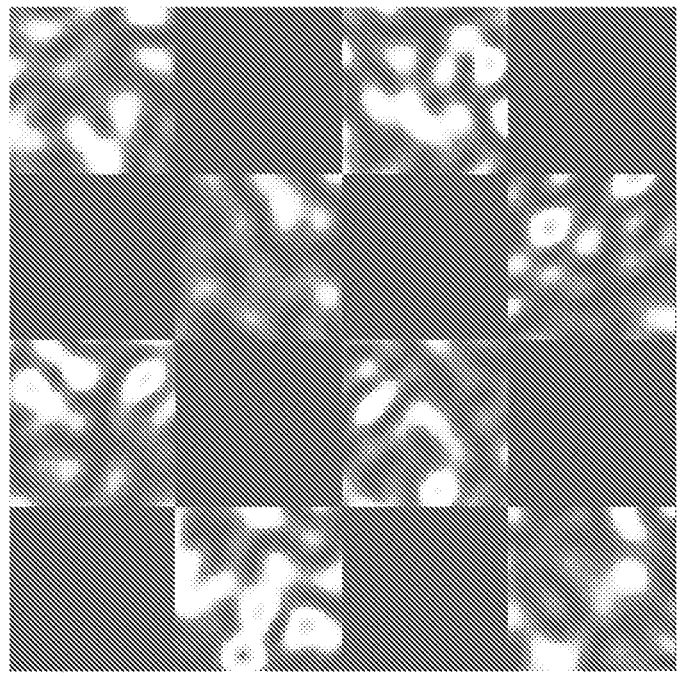
FIG. 4 is a high level schematic illustration of a mask, according to some embodiments of the invention.
Figure 4:
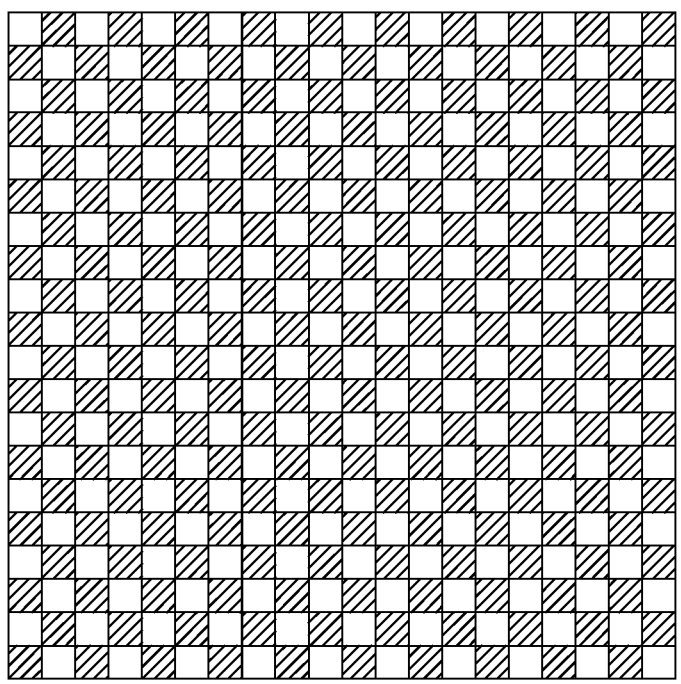

FIG. 4 is a high level schematic illustration of mask 122, according to some embodiments of the invention. In a non-limiting example of checkered mask 122, the total edge length in the aperture stop area is increased, causing, under some configurations, a relative increase in modulation 141 with respect to DC 142. Image 122A illustrated a mask overlapping a speckle pattern to illustrate that movements of the latter result in overall intensity fluctuations. Due to non-symmetrical speckle structure the entrance of the single speckle into the open squares is not equal to the exiting part of the speckle during the speckle shift. Mask 122 may be designed and optimized with respect to a trade-off between increasing single edge crossings to enhance modulation 141 and avoiding multiple edge crossings (i.e., speckle pattern parts moving from one square to another square) which enhance DC 142.

Figure 5:
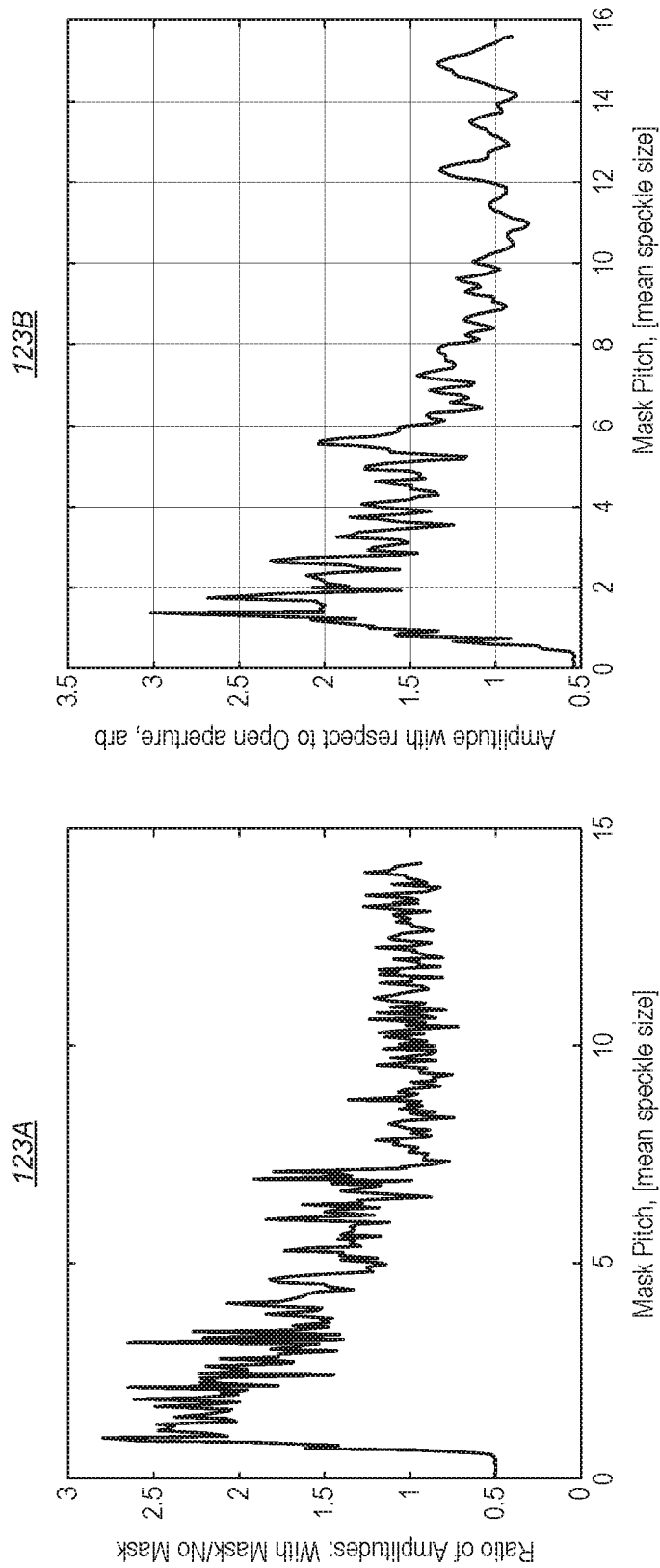
FIG. 5 is an exemplary illustration of simulation and experimental results concerning the effectivity and configuration of the mask, according to some embodiments of the invention.

FIG. 5 is an exemplary illustration of simulation and experimental results concerning the effectivity and configuration of mask 122, according to some embodiments of the invention. Graph 123A illustrates simulation results (using simulated speckle patterns), averaged over multiple different speckle patterns, of the effect of mask pitch on the modulation amplitude. Generally, the range of mask pitch above about seven mean speckle sizes does not contribute to increase the modulation to DC ratio, while mask pitches between ca. 0.2-7 mean speckle sizes do increase the modulation to DC ratio, with optimal mask pitch around 1-3 mean speckle sizes. Clearly, this is a non-limiting example, at simulation conditions, yet it demonstrates the feasibility of the disclosed invention. Graph 123B illustrates similar experimental results, which validate the simulation results shown in graph 123A. It is noted that mathematical simulations and experiments were carried out to model the effect of various masks on the system's sensitivity, with good correspondence between simulations and experiments in that the speckle characteristics (speckle size, statistics) that enable the operation of system 100 meet the theoretical assumptions and in that a significant signal amplification (modulation to DC) was achieved with a checkered mask, reaching in experiments and simulations a factor of three.

In certain embodiments, coherent light source 110 may comprise a diverging, eye safe, laser, and optical unit 120 may comprise a camera at a corresponding wavelength range. System 100 may be configured to detect movements from the specific area of the detected vibrations, and may be used for non-destructive examination (e.g., of flying platforms, of electric transformers, of structures, etc.).

Figure 6:
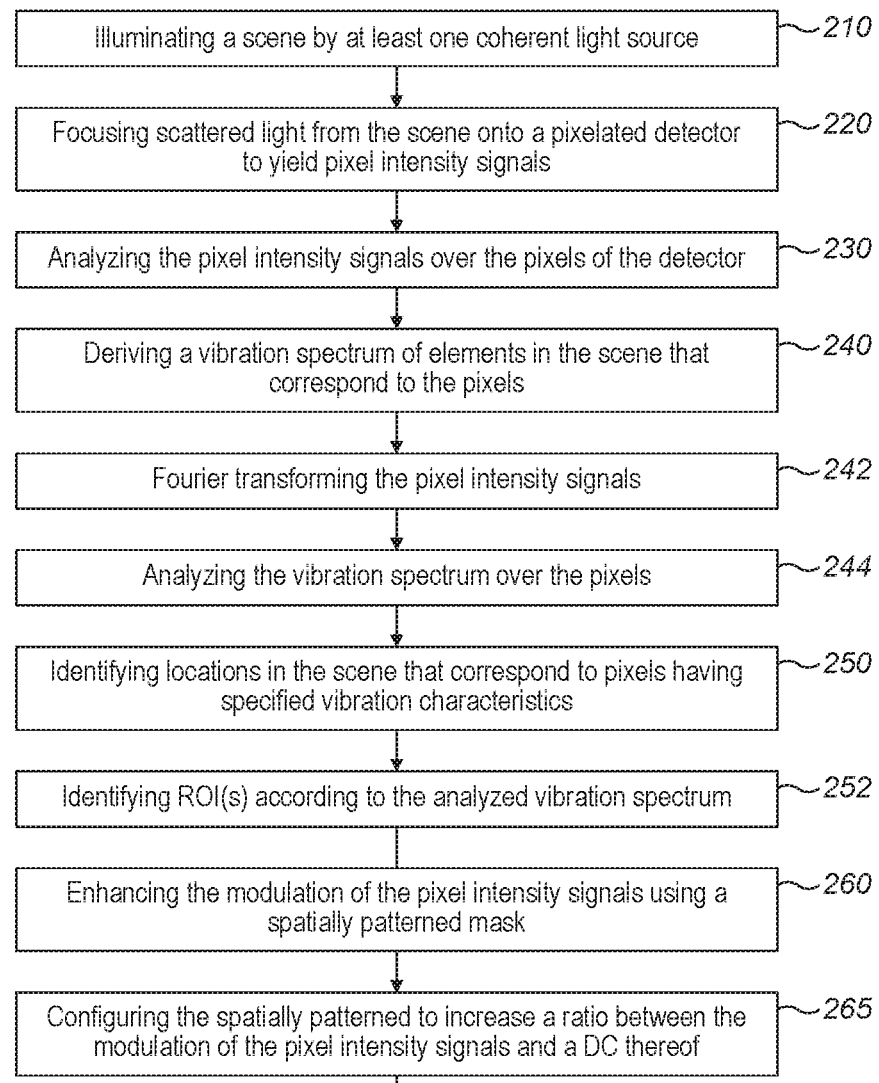
FIG. 6 is a high level list illustrating stages of a method, according to some embodiments of the invention.
Figure 6:
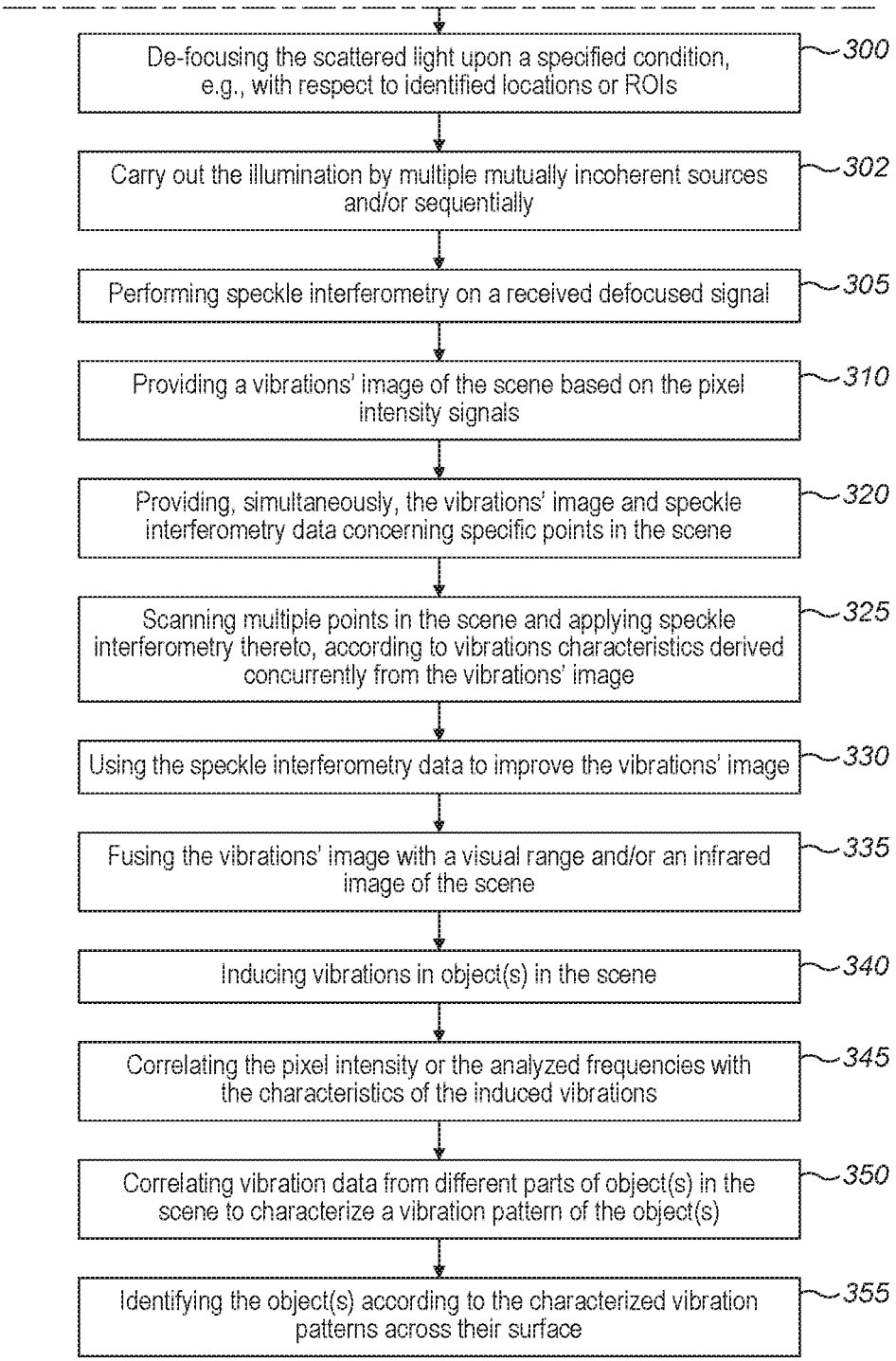

FIG. 6 is a high level list illustrating stages of a method 200, according to some embodiments of the invention. The method stages may be carried out with respect to system 100 described above, which may be configured to implement method 200. Method 200 may be at least partially implemented by at least one computer processor (not shown). Certain embodiments comprise computer program products comprising a computer readable storage medium having computer readable program embodied therewith and configured to carry out of the relevant stages of method 200.

Method 200 may comprise illuminating a scene by at least one coherent light source (stage 210), focusing scattered light from the scene onto a pixelated detector to yield pixel intensity signals (stage 220) and analyzing the pixel intensity signals over the pixels of the detector (stage 230) to derive a vibration spectrum of elements in the scene that correspond to the pixels (stage 240). Analyzing 240 may comprise Fourier transforming the pixel intensity signals (stage 242) and analyzing vibration spectra over the pixels (stage 244).

Method 200 may comprise identifying locations in the scene that correspond to pixels having specified vibration characteristics (such as spectrum, amplitude etc,) (stage 250) and/or identifying at least one ROI according to the analyzed vibration spectrum (stage 252). Method 200 may comprise enhancing the modulation of the pixel intensity signals using a spatially patterned mask in the optical unit (stage 260) and optionally configuring the spatially patterned mask to increase a ratio between the modulation of the pixel intensity signals and a DC thereof (stage 265).

Method 200 may comprise de-focusing the scattered light upon a specified condition (stage 300), e.g., with respect to identified locations or ROIs, and performing speckle interferometry on a received defocused signal (stage 305), with respect to the identified ROIs or locations. Method 200 may further comprise carrying out illuminating 210 by a plurality of coherent illumination sources which are not coherent with each other and have different direction of illumination with respect to the elements in the scene and/or carrying out illuminating 210 sequentially from different directions (stage 302).

Method 200 may comprise providing a vibrations image of the scene based on the pixel intensity signals (stage 310) and, possibly simultaneously, speckle interferometry data concerning specific points in the scene (stage 320). Method 200 may comprise scanning a plurality of points in the scene and applying speckle interferometry thereto, according to vibrations characteristics derived concurrently from the vibrations' image (stage 325). Method 200 may comprise using the speckle interferometry data to improve the vibrations' image (stage 330). Method 200 may comprise fusing a vibrations image based on the derived temporal spectra with a visual range image of the scene (stage 335).

Method 200 may comprise inducing vibrations in at least one object in the scene (stage 340), and correlating the pixel intensity signals with characteristics of the induced vibrations (stage 345). Method 200 may comprise correlating vibration data from different parts of at least one object in the scene to characterize a vibration pattern of the at least one object (stage 350) and optionally identifying the at least one object according to the characterized vibration patterns across a surface of the at least one object (stage 355).

Advantageously, system 100 and method 200 provide at the same time the in-focus picture of the scene and the vibration hot spots in the scene, and enable to find quickly the spots of strongest vibration amplitude. Optionally, system 100 may be programed to switch automatically among various positions of strongest vibrations and explore them practically simultaneously in real-time.

Advantageously, system 100 and method 200 enable quick finding of the spots with predefined characteristics (such as amplitude level, frequency content etc.), may automatically switch to "de-focused" operation mode to improve the sensing quality while continuously updating the picture of vibrations in the overall scene and following their variation with time.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for imaging of vibrations in a scene, the system comprising:
    at least one coherent light source configured to illuminate the scene comprising multiple scene elements;
    an optical unit in association with a pixelated detector comprising multiple pixels and a specified field of view that at least partly overlaps with the scene, wherein the optical unit is configured to focus light scattered from the multiple scene elements in the scene onto the pixelated detector such that light scattered from each scene element of the multiple scene elements is focused on a corresponding pixel of the multiple pixels on the pixelated detector, and wherein the detector is configured to provide, for each pixel of the multiple pixels, a pixel intensity signal of the pixel thereof, to thereby yield corresponding multiple pixel intensity signals, wherein the optical unit further comprises a spatially patterned mask configured to enhance a modulation of the pixel intensity signals and to increase a ratio between the modulation of the pixel intensity signals and a DC thereof; and
    a processing unit configured to analyze each pixel intensity signal of the multiple pixel intensity signals and to derive, for each pixel of the multiple pixels and based on the respective pixel intensity signal, a vibration spectrum of the scene element in the scene that corresponds to the pixel thereof, to thereby yield corresponding multiple vibration spectrums, wherein the processing unit is further configured to optimize the spatial pattern of the mask according to specified criteria.

2. The system of claim 1, wherein the processing unit is configured to analyze the pixel intensity signals by analyzing respective temporal and frequency characteristics of the pixel intensity signals and to identify at least one ROI according to the analyzed temporal and frequency characteristics, and wherein the optical unit is further configured, upon a specified condition, to de-focus the scattered light and the processing unit is further configured to perform speckle interferometry on a received defocused signal, with respect to the identified at least one ROI.

3. The system of claim 2, wherein the at least one coherent illumination source comprises a plurality of coherent illumination sources which are not coherent with each other and have different directions of illumination with respect to the elements in the scene.

4. The system of claim 2, wherein the at least one coherent illumination source is configured to sequentially illuminate the elements in the scene from different directions.

5. The system of claim 1, wherein the processing unit is further configured to derive a vibrations image from the analyzed pixel intensity signals.

6. The system of claim 5, wherein the processing unit is further configured to enhance the vibrations image with speckle interferometry data.

7. The system of claim 5, wherein the processing unit is further configured to fuse the vibrations image with a visual range and/or infrared image of the scene.

8. The system of claim 1, further comprising a vibrations inducing module configured to induce vibrations in at least one object in the scene, wherein the processing unit is further configured to correlate the analyzed pixel intensity signals with characteristics of the induced vibrations and to identify the at least one object according to vibration patterns across a surface of the at least one object, which are characterized according to the correlation.

9. A method of imaging vibrations in a scene, the method comprising:
    illuminating the scene comprising multiple scene elements by at least one coherent light source,
    focusing light scattered from the multiple scene elements in the scene onto corresponding multiple pixels on a pixelated detector having a specified field of view that at least partly overlaps with the scene, wherein light scattered from each scene element of the multiple scene elements is focused on one pixel of the multiple pixels on the pixelated detector;
    providing, for each pixel of the multiple pixels, a pixel intensity signal of the pixel thereof, thereby yielding corresponding multiple pixel intensity signals,
    enhancing a modulation of the pixel intensity signals using a spatially patterned mask and configuring the spatially patterned mask to increase a ratio between the modulation of the pixel intensity signals and a DC thereof, and analyzing each pixel intensity signal of the multiple pixel intensity signals and deriving, for each pixel of the multiple pixels and based on the respective pixel intensity signal, a vibration spectrum of the scene element in the scene that corresponds to the pixel thereof, thereby yielding corresponding multiple vibration spectrums.

10. The method of claim 9, wherein the analyzing comprises analyzing respective temporal and frequency characteristics of the pixel intensity signals, identifying at least one ROI according to the analyzed temporal and frequency characteristics and de-focusing the scattered light upon a specified condition, and performing speckle interferometry on a received defocused signal, with respect to the identified at least one ROI.

11. The method of claim 10, wherein the illuminating is carried out by a plurality of coherent illumination sources which are not coherent with each other and have different directions of illumination with respect to the elements in the scene.

12. The method of claim 10, wherein the illuminating is carried out sequentially from different directions.

13. The method of claim 10, further comprising providing, simultaneously, a vibrations image of the scene based on the analyzed pixel intensity signals and speckle interferometry data concerning specific points in the scene.

14. The method of claim 13, further comprising scanning a plurality of points in the scene and applying speckle interferometry thereto, according to vibrations characteristics derived concurrently from the vibrations image.

15. The method of claim 13, further comprising using the speckle interferometry data to improve the vibrations image.

16. The method of claim 9, further comprising fusing a vibrations image based on the analyzed pixel intensity signals with a visual range image of the scene.

17. The method of claim 9, further comprising inducing vibrations in at least one object in the scene, and correlating the analyzed pixel intensity signals with characteristics of the induced vibration.

18. The method of claim 9, further comprising correlating analyzed pixel intensity signals from different parts of at least one object in the scene to characterize a vibration pattern of the at least one object and identifying the at least one object according to the characterized vibration pattern across a surface of the at least one object.

* * * * *